Figure 1:
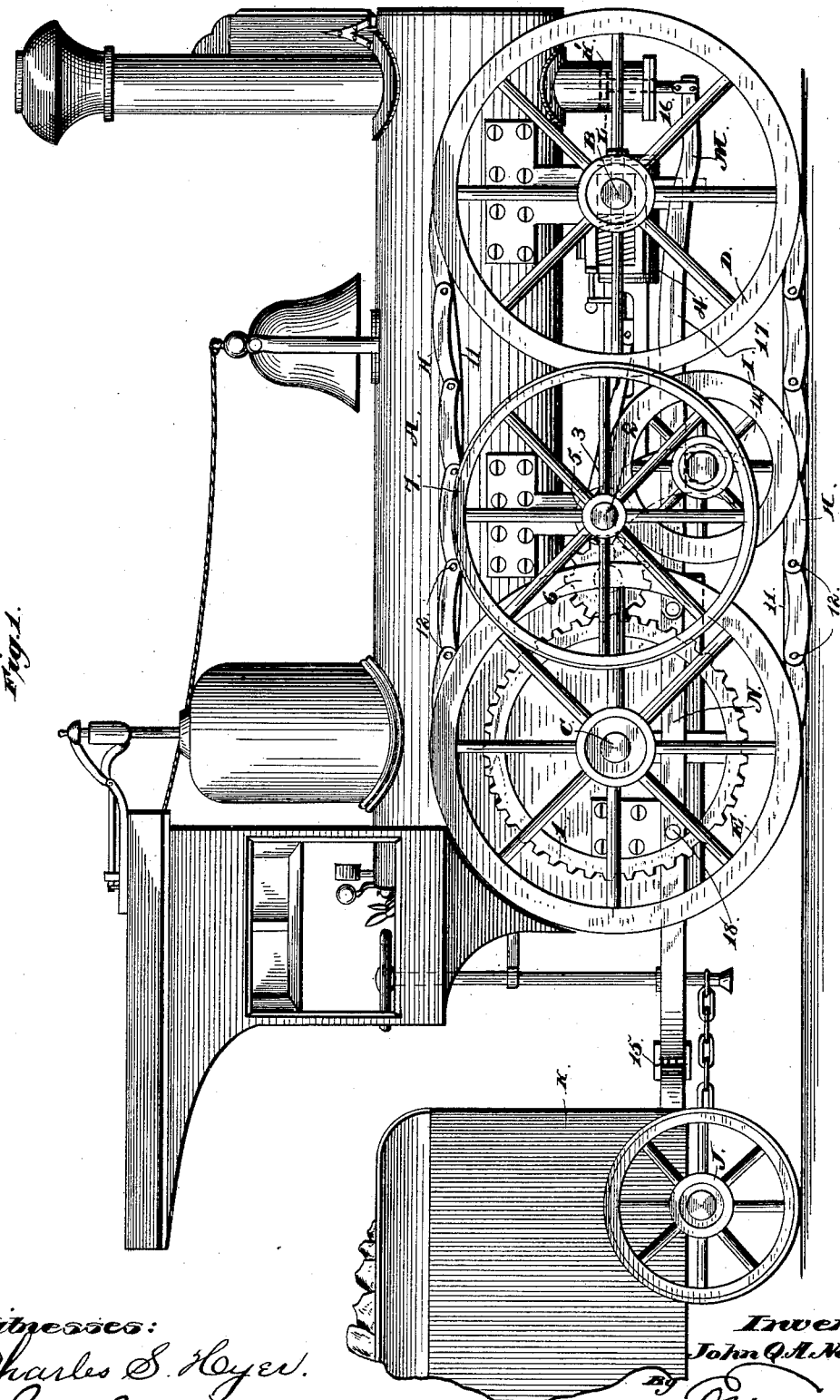

(No Model.)  
5 Sheets—Sheet 1.

J. Q. A. NEWSOM.
TRACTION ENGINE.

No. 353,155. Patented Nov. 23, 1886.

Witnesses:  
Charles S. Hyer.  
L. W. Seely

Inventor:  
John Q. A. Newsom.

(No Model.) 5 Sheets—Sheet 2.
J. Q. A. NEWSOM.
TRACTION ENGINE.
No. 353,155. Patented Nov. 23, 1886.
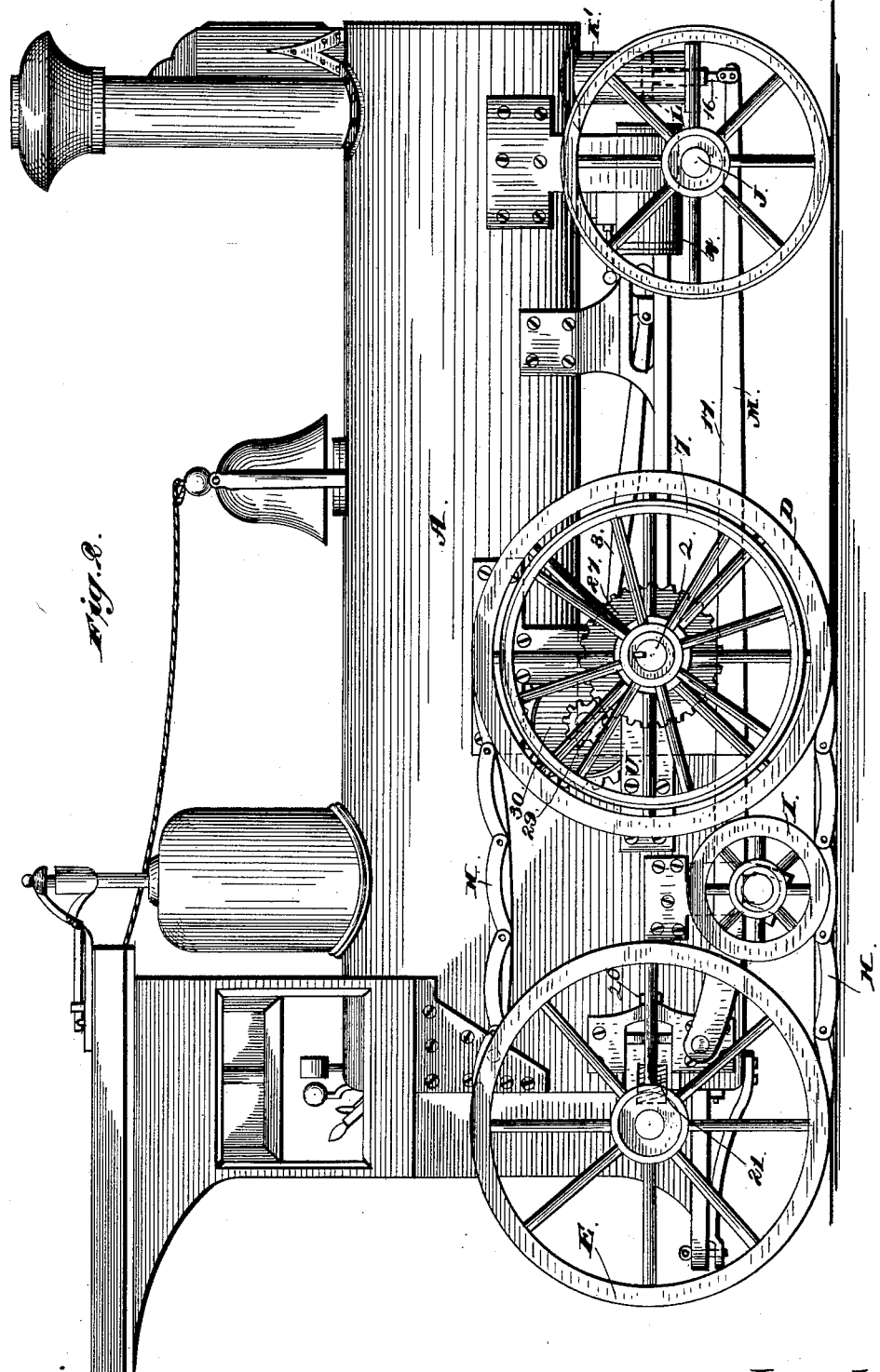
Witnesses:
Charles S. Heyer.
L. W. Seely
Inventor:
John Q. A. Newsom.
By
Atty.

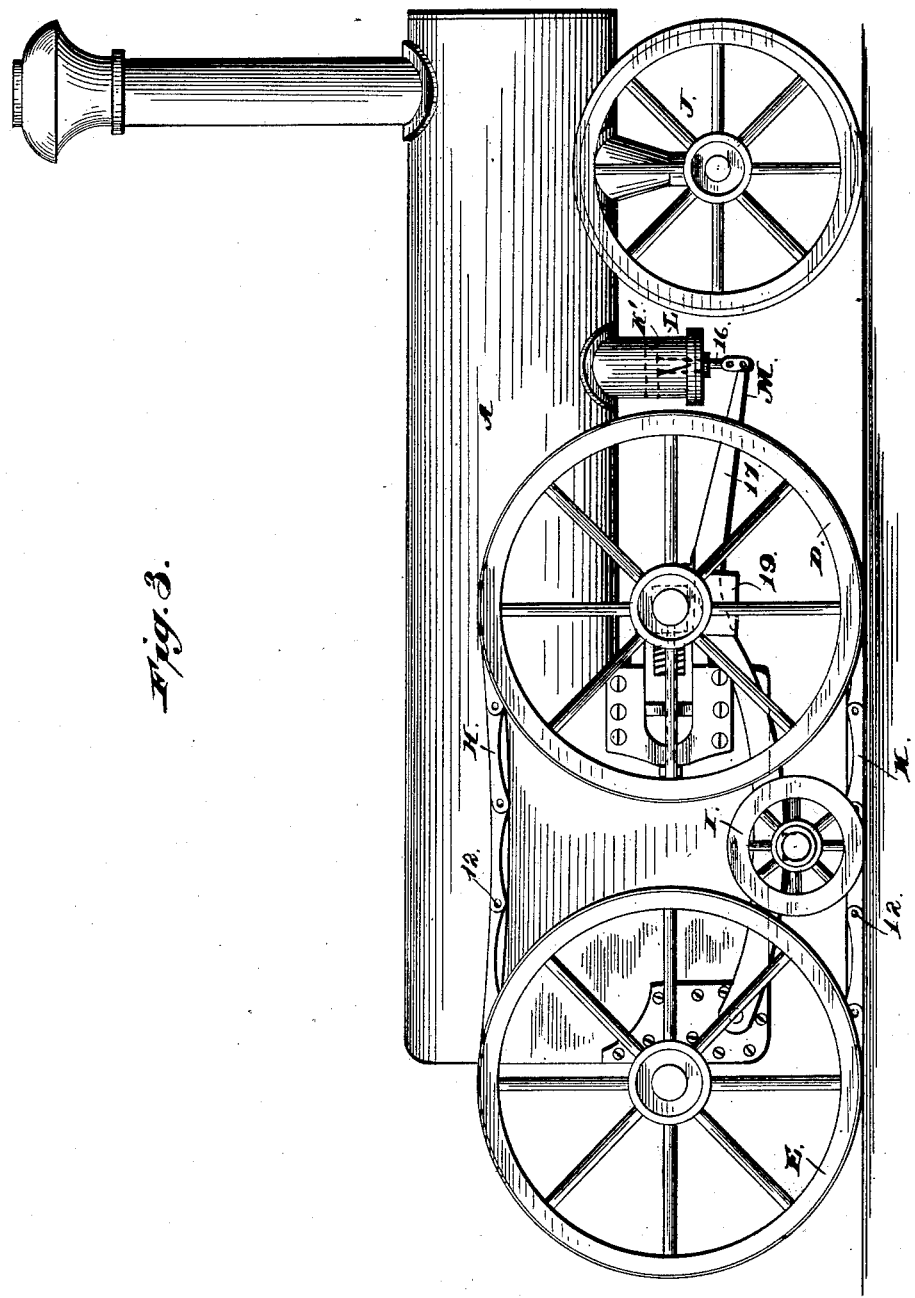

(No Model.) 5 Sheets—Sheet 4.
J. Q. A. NEWSOM.
TRACTION ENGINE.
No. 353,155. Patented Nov. 23, 1886.
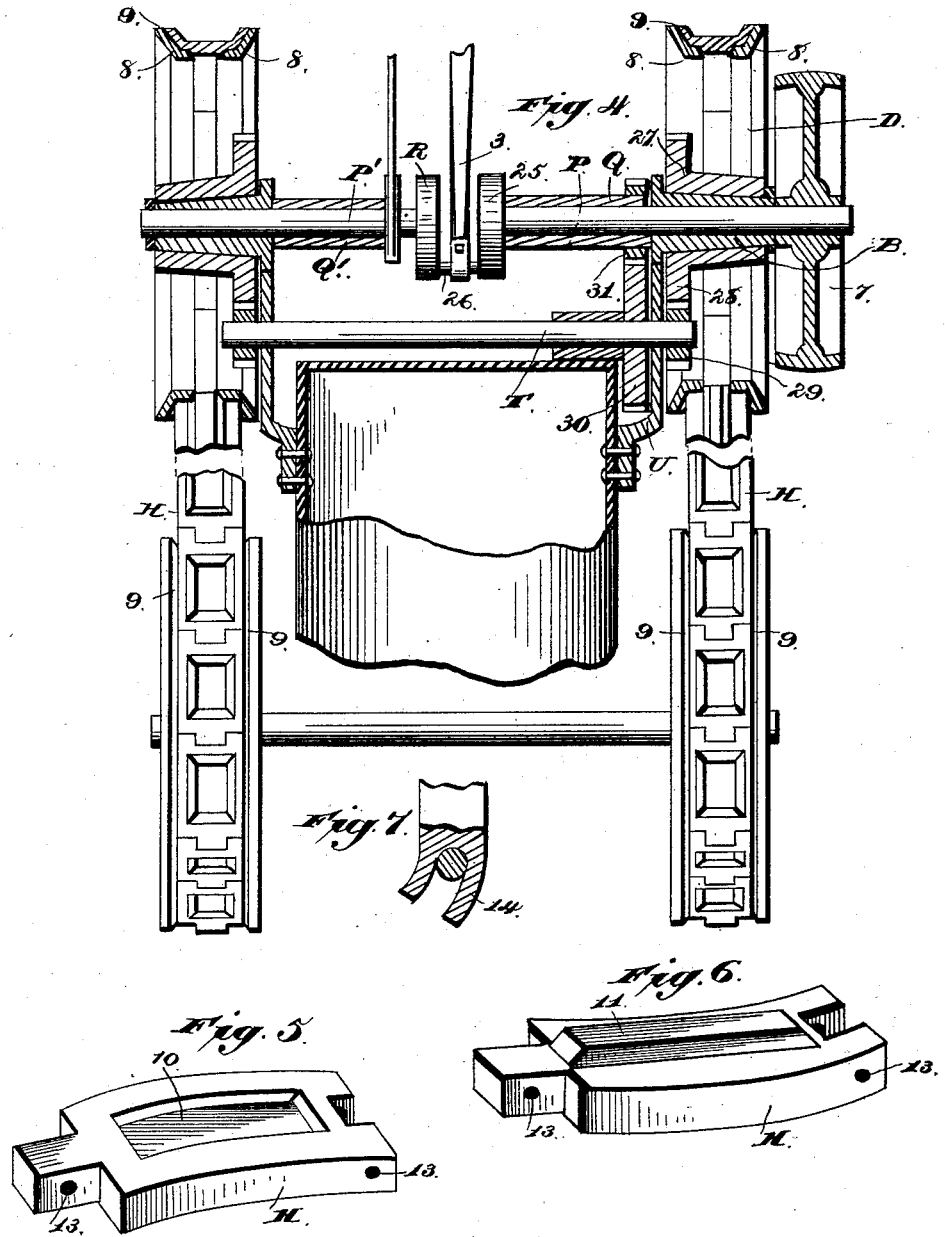

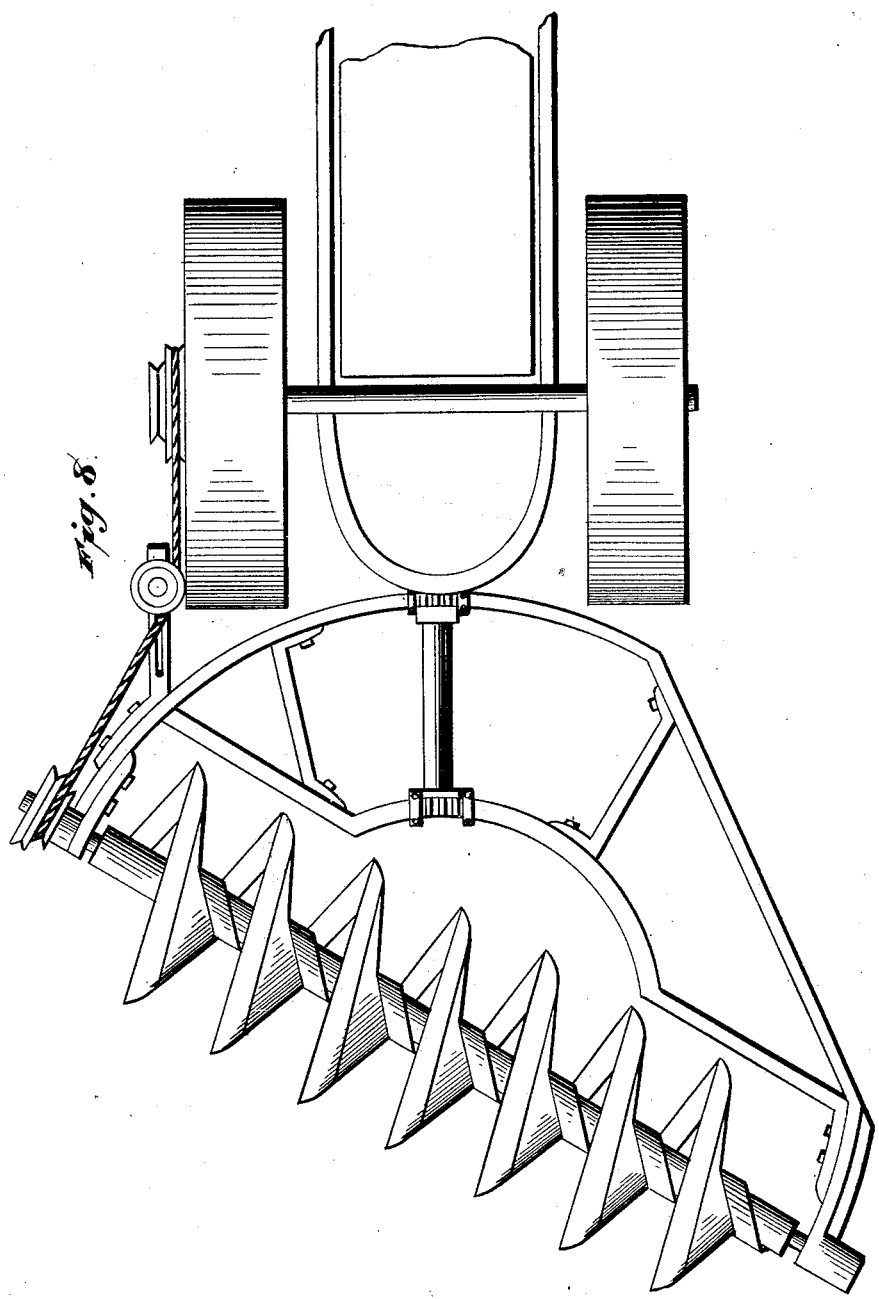

UNITED STATES PATENT OFFICE.

JOHN Q. A. NEWSOM, OF SEYMOUR, INDIANA.

TRACTION-ENGINE.

SPECIFICATION forming part of Letters Patent No. 353,155, dated November 23, 1886.

Application filed February 13, 1886. Serial No. 191,825. (No model.)

*To all whom it may concern:*

Be it known that I, JOHN Q. A. NEWSOM, a citizen of the United States, residing at Seymour, in the county of Jackson and State of Indiana, have invented certain new and useful Improvements in Traction-Engines; and I do hereby declare the following to be a full, clear, and exact description of the invention, such as will enable others skilled in the art to which it appertains to make and use the same.

My invention relates to traction-engines for road and farm use; and my object is to provide an engine of simple construction which is adapted to be used as a portable stationary engine for transmitting power to different kinds of machinery—such as thrashing-machines, corn-shellers, and saw-mills—as well as to operate a roller or a gang-plow or spiral plow in farming operations on a large scale, and, in short, for all the purposes for which traction-engines can be employed.

I have shown and described several different forms of engines belonging to the general class in which the traction-wheels support a flexible traction-belt which runs on the ground between the wheels, and acts as a track which is constantly taken up and relaid, and upon which the wheels travel, the belt in its contact with the ground forming the traction-surface. My traction-engines, however, include improvements upon this general class, among which may be mentioned a novel construction of the track-sections, by which their traction-power when in contact with the ground is greatly increased.

Another special improvement consists in providing the engine with two pairs of traction-wheels carrying the chain track and journaled so as to run in an unvarying plane of rotation, and in combining with them a steering-truck located either at the front or rear of the engine, and special devices upon which the greater portion of the weight of the engine and drive-wheels is brought while the steering-truck is being operated, so that the steering of the engine is carried on easily and effectively in spite of the rigid attachment of the drive-wheels, it being readily understood that in the absence of some such device the large wheel-base afforded by two pairs of non-swiveling traction-wheels, would prevent the effective operation of a single steering-truck.

The invention consists, further, in providing a very large wheel-base to the engine, which not only increases the tractive power, but also prevents the front part of the engine from raising or "rearing up."

It consists, further, in arranging the crank-shaft and other working parts and the power-connections below the boiler so as to bring the center of gravity as low as possible, and thus insure the stability of the engine.

It consists, further, in the construction and arrangement of the gearing for transmitting power from the crank-shaft to the traction-wheels, and, finally, in details of construction which are illustrated in the drawings and fully hereinafter described.

The invention is shown in the accompanying drawings, in which Figure 1 is a side elevation of a traction-engine having a rear steering-truck and constructed according to my invention. Fig. 2 is a side elevation of an engine embodying my invention, but steering in front by a pilot-truck. Fig. 3 is a side elevation of a traction-engine having a front steering-truck and a power-pulley, and also embodying my invention. Fig. 4 is a plan view of the engine shown in Fig. 3, the driving-wheels being shown on one side in top plan and on the other in cross-section taken through the main axle. Fig. 5 is a perspective of one of the track-plates. Fig. 6 is a perspective of the opposite side of such plate. Fig. 7 is a sectional view showing the recessed bracket for supporting the wheel. Fig. 8 illustrates the connection of the engine to a plow.

Referring to Fig. 1 of the drawings, A represents the boiler of a traction-engine, which is shown as resembling in form an ordinary locomotive-boiler, and having a steam-dome, smoke-box, and stack of ordinary construction. As the construction of the boiler forms no part of my present invention, it is evident that a vertical boiler may be substituted, if desired, the changes necessary being mere matters of mechanical construction. B C represent the front and rear axles, respectively, of the front and rear pairs of traction-wheels D and E. The front axles, B, are held stationary by being bolted to the boiler, and are cylindrical journals which receive the hubs of the traction-wheels. The rear axle, C, is bent down inside the journals, so as to pass below the fire-box, in which it is secured or bolted. It will thus be seen that the traction-wheels run rigidly in line or in an unvarying plane of rotation, forming a steady and constant guide to the track carried by them. The traction-wheel E is shown as the driver, to its hub or spokes being secured a large spur-wheel, 1, to which power is transmitted from a crank-shaft, 2, journaled in boxes bolted to the boiler and connected to the pitman-rod 3 and steam-cylinder 4. A spur-gear, 5, is mounted on the crank-shaft, which, through an intermediate gear-wheel, 6, operates the spur-wheel 1 and traction-wheel, the sizes of the gear-wheels being fixed relatively to gear the traction-wheels down for power, as will be readily understood. The opposite wheel on the other side may also be made a driver by a duplication of the gearing just described. On the end of the crank-shaft 2 is a pulley, 7, which is the power-pulley when the machine is used as a stationary engine.

The construction of the traction-wheels and endless track is illustrated in Fig. 4, which shows the rear wheels in plan view and the front wheels in horizontal section, taken through the boxes. Each wheel is composed of two separate sections, 8, of angular cross-section mounted on a common hub and connected by crossed spokes and braces, so as to be firm and rigid. The periphery of the wheel thus has a continuous longitudinal opening between the sections, the angular shape of which forms continuous flanges 9 9, which hold the track, the plates of the track bridging the opening between the wheel-sections.

The track H is composed of solid metallic plates, of which a detail view is shown in Fig. 6. Each plate is curved longitudinally to fit the circumference of the wheel, and is provided on its bottom or traction surface with a rectangular recess, 10, and on its other side with a projection, 11, which enters the space between the sections of the wheel, the edges of the track-plates being beveled to fit the inclined flanges of the wheel-sections. The sections of track are hinged together by transverse pins 12, which pass through perforated eyes 13 on the adjoining track-plates, rendering them sufficiently flexible to conform to the shape of the wheels and making a smooth surface upon which such wheels run. The track couples the traction-wheels together on both sides of the engine and forms the entire traction-surface. The principal feature of this construction of the flexible track is the formation of the rectangular recesses on the bottom. When the weight of the engine is brought upon the track for a distance equal to the distance between the axles of the respective pairs of wheels, several of the plates will be forced into the ground, compressing the soil within each recess. This produces a greater amount of resistance to the progress of each plate than is obtained by the use of the projecting teeth or diagonal ribs ordinarily employed, since the inclosed earth presses upon all sides of the recessed plate, and is only disengaged therefrom when the plate is lifted by the rear wheel. It is also true that as the air is forced out from the inclosed recess a vacuum is formed between the earth and the bottom of the recess, which, on well-known principles, also resists the tendency to slip.

Between the two pairs of traction-wheels is journaled a pair of wheels, I, the axle of which has a slight vertical movement in slotted boxes 14. These wheels I run upon the track, as shown in Fig. 1. When they are depressed below the base-line of the traction-wheels, they cause that portion of the chain which supports them to become a pivotal point, which carries the weight of the engine, and upon which the entire machine can be swung. By using a device of this character I am enabled to secure the advantages resulting from the extended rigid-wheel base of the fixed drivers without the disadvantages arising from the difficulty of steering with non-swiveling axles. Even with a front pilot-truck it would be practically impossible to make the rigid drivers respond to the unassisted movement of such a truck. By using a single steering-truck (which may be located either in front or rear) as an auxiliary to these wheels I, I am able to swing the whole engine on these wheels as a pivot, and thus bring the drive-wheels into line while the latter are practically off the ground.

In Fig. 1 I have illustrated the operation of this device in connection with a rear steering-truck, J, mounted on a tender, K, the tender being connected with the engine by swiveled coupling 15, which permits the engine and tender to move slightly, to accommodate themselves to uneven ground. The truck J may be turned by a chain wound on a shaft operated in the cab of the engine, as shown, and the length of the leverage between the truck J and the wheels I is sufficient when the drivers are off the ground and the truck J is turned to swing the whole engine on the wheels I to correspond with the position of the steering-truck.

The means for throwing the weight of the engine on the wheels I are illustrated in Figs. 1, 2, and 3. A vertical cylinder or ram, K', is located on the engine, having steam connections with the steam-dome, and in which works a piston, L. The piston-rod 16, which extends downward through the cylinder-head, is hinged by means of a small link to a long lever, M, which extends back below the boiler, and has a fork, 17, the arms of which bear upon the axle of the wheels I. To the ends of the fork are pivoted levers N, which are also pivoted to the fire-box, as shown at 18, and then curving around the fire-box meet and are connected to the tender by means of the coupling 15. Steam-pressure to any extent may be introduced into the cylinder K' above the piston, which is thus forced down, causing the lever M to bear upon the axle of the wheels I, pressing it down, and thus raising the drive-wheels. It is obvious that this movement of the lever will also depress the extreme end of the lever N, causing the steering-truck to bear more firmly on the ground. The weight of the engine is thus sustained by the truck J and wheels I I, and it is then in position for being steered, as before described.

It should be remarked that in place of a tender, as shown in the drawings, such a steering truck or wheel could be mounted upon a plow or roller or whatever device might be coupled to the engine in the rear, it being only requisite that in steering a portion of the weight should be thrown upon such steering wheel or truck.

Figs. 2 and 3 show side elevations of engines which embody the principles of my invention, but in which a front steering-truck is used. The boiler in these forms of engine projects beyond the traction-wheels sufficiently to give room for the pilot-truck J, which bears constantly on the ground and sustains a portion of the weight. The construction of the steam-cylinder K' is in all respects like that just described, but the shape of the lever M is somewhat changed. The forks 17, which extend from near the piston-rod connection, proceed straight through extended guides 19, forming part of the boxes for the front traction-wheel. They are then bent downward to bear on the axle of the wheels I I, and then extend back to the fire-box to a pin, on which they are hinged.

It is of course unnecessary to connect the lever to the front pilot-truck, since the raising of the traction-wheels by the depression of wheels I will lift only the rear part of the engine, throwing the remainder of the weight upon the forward steering-truck. This is true of the engines shown in both Figs. 2 and 3. The engine shown in Fig. 3 is a simple traction-engine without any power-connections. In Fig. 2 I have shown an engine having a front steering-truck, in which the forks 17 of the lever M run directly and nearly horizontally to the fire-box, where it is hinged.

In order to provide for tightening the flexible track when necessary, I make the boxes of one of the pairs of traction-wheels movable in slots, as shown, and I adjust the boxes to position by screw-bolts 20, so that when adjusted they may still yield slightly against the pressure of a spring, 21; but I have found that it is unnecessary to use any carrying-springs on the engine-frame, as by cushioning steam in the cylinder K', I obtain a slight play of the traction-wheels sufficient to absorb vibration and ease the frame-work from rough shocks received in traveling.

Of course, steam may be introduced into the bottom of cylinder K' for restoring the drive-wheels to their natural position, but the effect of the exhaust from the upper part of the cylinder when used, to which is added the weight of the engine, will ordinarily accomplish this result.

I have shown in Fig. 4 by horizontal section the gearing which may be used in all the forms of engines described herein. In this figure P represents the fly-wheel shaft, which has keyed to it a sleeve, Q, and carries on its inner end a disk, 25. This disk is connected with another disk, R, by the crank-pin 26, on which is mounted the connecting-rod of the engine. The fly-wheel shaft is continued, as shown at P', and is journaled in a box, Q'. It then extends through to the other side of the machine, where it may support another fly-wheel. The driving-wheel D has a hub, 27, which turns on the fixed axle B, and has keyed to or formed integral with it a spur-gear, 28. T represents a counter-shaft carrying at its end a spur-wheel, 29, which meshes with the wheel 28. On the counter-shaft is also a pinion, 30, which, in connection with a pinion, 31, on the fly-wheel shaft P, forms a speed-gearing. The movement of the fly-wheel shaft operates the counter-shaft through the speed-pinions, and this in turn moves the hub of the traction-wheel through pinions 28 and 29. U represents a casting bolted to the fire-box, which supports the gearing. The gearing on the opposite side of the engine is in all respects like that just described, except that the compensating-pinions are omitted.

I have shown in Fig. 9 a plan view of a rotary spiral plow connected to my traction-engine by a rigid coupling, so that when the rear traction-wheels are lifted the entire plow-frame will also be lifted in turning corners. This device, however, could only be used with engines having a front steering-truck.

It is obvious that many changes in details of construction may be made without departing from the spirit of my invention.

Having thus fully described my invention, what I claim as new, and desire to secure by Letters Patent, is—

1. A steam traction-engine having traction-wheels carrying an endless track and running on fixed axles, a steering wheel or truck, a pair of auxiliary wheels having a limited vertical movement, and means for depressing such wheels below the base-line of the main traction-wheels, substantially as described.

2. In a steam traction-engine, the combination of the traction-wheels mounted on fixed axles and supporting the engine, a pair of auxiliary wheels having a limited vertical movement, an auxiliary steam-cylinder, a piston within such cylinder connected to the auxiliary wheels, a swinging steering wheel or truck, and an endless track on the traction-wheels, substantially as described.

3. A traction-engine having traction-wheels running in an unvarying plane relatively to the engine-frame, an endless track, a single steering wheel or truck, a pair of auxiliary wheels journaled between the drive-wheels and running on the endless track, and means for depressing said auxiliary wheels below the plane of the base-line of the traction-wheels.

4. In a steam traction-engine, the combination, with the boiler-frame and front and rear traction-wheels, of a pair of auxiliary wheels, as I, mounted in curved slotted boxes placed between the traction or driving wheels, a steam cylinder and piston, and connections between said auxiliary wheels and piston in the form of a lever, by which the said wheels I may be raised above or lowered below the base-line of the driving or traction wheels, substantially as and for the purposes set forth.

5. In a steam traction-engine mounted upon traction-wheels running in a fixed plane of rotation and carrying an endless track, a pair of wheels, as I, having a limited vertical movement and running upon the endless track, a steam cylinder and piston independent of the main driving-cylinder, and a pivoted lever connected to the piston-rod of such cylinder and bearing upon the axle of the said wheels I, substantially as described and shown.

6. A flexible endless track for a traction-engine, composed of plates each formed in one piece hinged together, and having rectangular recesses in their bottom faces, substantially as and for the purposes set forth.

7. In combination with a traction-wheel composed of two sections mounted upon a common hub and having inclined flanges, an endless flexible track composed of hinged plates having rectangular recesses on their traction-surface, and a rib adapted to fit the space between the sections composing the wheel, substantially as described.

8. In a traction-engine having traction-wheels running in an unvarying plane of rotation, a pair of wheels, as I, journaled between the traction-wheels and running on the endless track supported by such wheels, a steering-truck located at the rear of the engine, and means for throwing the weight of the engine upon said wheels I and the rear steering-truck, substantially as described.

9. In a traction-engine, the combination of the fly-wheel shaft operated directly by the engine-crank and revolving on the journals of the main traction-wheels, a counter-shaft operated by the fly-wheel shaft, and in its turn operating such traction-wheel, substantially as described.

In testimony whereof I affix my signature in presence of two witnesses.

JOHN Q. A. NEWSOM.

Witnesses:
CHARLES S. HYER,
L. W. SEELY.